US010203665B2

(12) United States Patent
Lyman et al.

(10) Patent No.: US 10,203,665 B2
(45) Date of Patent: Feb. 12, 2019

(54) MANAGING HOME AUTOMATION SYSTEM BASED ON BEHAVIOR AND USER INPUT

(71) Applicant: Vivint, Inc., Provo, UT (US)

(72) Inventors: Jefferson Lyman, Alpine, UT (US); Michael Warner, Payson, UT (US); Nic Brunson, Salt Lake City, UT (US); Stefan Walger, Salt Lake City, UT (US); Wade Shearer, Lehi, UT (US); Jeremy B. Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 327 days.

(21) Appl. No.: 14/522,448

(22) Filed: Oct. 23, 2014

(65) Prior Publication Data

US 2015/0309483 A1 Oct. 29, 2015

Related U.S. Application Data

(63) Continuation-in-part of application No. 14/261,293, filed on Apr. 24, 2014.

(51) Int. Cl.
G05B 13/00 (2006.01)
G05B 13/02 (2006.01)
H04L 12/28 (2006.01)
G05B 15/02 (2006.01)

(52) U.S. Cl.
CPC .......... G05B 13/02 (2013.01); G05B 15/02 (2013.01); H04L 12/2803 (2013.01); H04L 12/2829 (2013.01); G05B 2219/2642 (2013.01)

(58) Field of Classification Search
CPC .................................................. G06F 13/0205
USPC ....................................................... 717/275
See application file for complete search history.

(56) References Cited

U.S. PATENT DOCUMENTS 4,987,402 A * 1/1991 Nykerk ................... B60R 25/04
340/309.16
4,994,787 A 2/1991 Kratt et al.
6,263,260 B1 * 7/2001 Bodmer ............... F24F 11/0034
236/46 R (Continued)

FOREIGN PATENT DOCUMENTS

GB 2218244 A * 11/1989

OTHER PUBLICATIONS

PCT International Search Report for International Application No. PCT/US2015/056920, dated Mar. 25, 2016 (3 pp.).

(Continued)

Primary Examiner — Evral E Bodden
(74) Attorney, Agent, or Firm — Holland & Hart, LLP

(57) ABSTRACT

Methods and systems are described for controlling settings of an automation system, such as a home and/or business automation system. According to at least one embodiment, an apparatus for controlling settings of an automation system includes a processor, a memory in electronic communication with the processor, and instructions stored in the memory which are executable by a processor to receive instructions about an intended action by a user of the home automation system, continuously detect behavior of the user with the home automation system, determine whether the intended action has occurred based on the detected behavior, and adaptively update one or more settings of the home automation system when the intended action is determined to have occurred.

20 Claims, 12 Drawing Sheets

(56) References Cited

U.S. PATENT DOCUMENTS

| | | | |
|---|---|---|---|
| 7,133,729 B1* | 11/2006 | Wang | G05B 15/02 |
| | | | 340/12.35 |
| 7,526,539 B1 | 4/2009 | Hsu | |
| 8,630,741 B1 | 1/2014 | Matsuoka et al. | |
| 9,230,560 B2* | 1/2016 | Ehsani | G10L 21/06 |
| 9,337,663 B2 | 5/2016 | Alberth, Jr. et al. | |
| 2005/0064916 A1 | 3/2005 | Ozluturk et al. | |
| 2010/0289643 A1 | 11/2010 | Trundle et al. | |
| 2013/0009865 A1 | 1/2013 | Valik et al. | |
| 2013/0073094 A1 | 3/2013 | Knapton et al. | |
| 2013/0204408 A1 | 8/2013 | Thiruvengada et al. | |
| 2013/0263034 A1 | 10/2013 | Bruck et al. | |
| 2014/0070959 A1 | 3/2014 | Bhargava et al. | |
| 2014/0171146 A1* | 6/2014 | Ma | H04M 1/72569 |
| | | | 455/550.1 |
| 2014/0324192 A1* | 10/2014 | Baskaran | G05B 15/02 |
| | | | 700/19 |
| 2015/0105911 A1 | 4/2015 | Slupik et al. | |

OTHER PUBLICATIONS

International Search Report and Written Opinion of the International Searching Authority for PCT/US2015/026914, dated Jul. 22, 2015.

Supplementary European Search Report for EP Application No. 15782981.3, dated Dec. 19, 2017 (7 pp.).

\* cited by examiner

MANAGING HOME AUTOMATION SYSTEM BASED ON BEHAVIOR AND USER INPUT

CROSS-REFERENCE TO RELATED APPLICATION

This application is a continuation-in-part of U.S. patent application Ser. No. 14/261,293, filed Apr. 24, 2014, the disclosure of which is incorporated, in its entirety, by this reference.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and security products. Advancements in mobile devices allow users to monitor and/or control an aspect of a home or business. As automation and security products expand to encompass other systems and functionality in the home and/or business, opportunities exist for additional automated functionality that requires limited user input.

SUMMARY

Methods and systems are described for controlling settings of an automation system, such as a home and/or business automation system. According to at least one embodiment, an apparatus for controlling settings of an automation system includes a processor, a memory in electronic communication with the processor, and instructions stored in the memory which are executable by a processor to receive instructions about an intended action to be performed by a user of the home automation system, continuously detect behavior of the user with the home automation system, determine whether the intended action has occurred based on the detected behavior, and adaptively update one or more settings of the home automation system when the intended action is determined to have occurred.

In one example, the behavior of the user may be detected within a home monitored by the home automation system. The intended action may include departing a property being monitored by the home automation system and the detected behavior may indicate with a predetermined level of probability that the user has left the property. The behavior of the user may be based at least in part on one of a geo-fence signal, a door operation sensor signal, and a motion sensor signal. The home automation system may include security features, and the one or more settings of the home automation system may include a security setting related to at least one of the security features. The one or more settings of the home automation system may include at least one of an HVAC setting, at least one light fixture setting, at least one security setting, and at least one lock mechanism setting for a barrier. The instructions may be executable by the processor to communicate with the user if the intended action has not occurred within a predetermined time period. The instructions may be executable by the processor to initiate an active state after receiving the instructions, wherein the active state may include prompting the continuously detecting of the behavior of the user, and canceling the active state if the intended action does not occur within a predetermined time period. The instructions may be received via at least one of a control panel of the home automation system and a mobile computing device.

Another embodiment is directed to a computer-program product for controlling a home automation system. The computer-program product includes a non-transitory computer-readable medium storing instructions executable by a processor to receive an indication that a user of the home automation system intends to depart a property being monitored by the home automation system, continuously detect user behavior with the home automation system, determine whether the user has left the property based at least in part on the detected user behavior, adaptively update one or more settings of the home automation system if the user has been determined to have left the property, and operate the home automation system based at least in part on the updated one or more settings. The behavior may include at least one of operating an exterior door, operating a light fixture, presence in a certain location of the property, and operating a garage door. The one or more settings may control at least one of a security feature, an HVAC system, a light fixture, and a lock mechanism. The instructions may be executable by the processor to generate a message for the user if the user has not departed the property within a predetermined time period. The message may include an inquiry concerning an intent of the user to depart the property. The message may be in the form of at least one of an audible message or a text message generated at a control panel of the home automation system, generated at an appliance of the property, or generated by a mobile computing device associated with the user. The instructions may be executable by the processor to receive instructions about a user of the home automation system to cancel the indication.

A further embodiment relates to a computer-implemented method for controlling settings of a home automation system. The method includes receiving input concerning an intended action to be performed by at least one user of the home automation system, initiating an active mode to continuously detect at least one of user locations, user movements, and user activities with the home automation system, determining whether the intended action has occurred based on the at least one of the detected user locations, the detected user movements, and the detected user activities, adaptively updating one or more settings of the home automation system if the intended action has occurred, and automatically cancelling the active mode if the intended action has not occurred within a first predetermined time period.

In one example, the method includes generating a communication if the intended action has not occurred within a second predetermined time period that is less than the first predetermined time period. The method may include receiving instructions in response to the communication, and canceling the active mode in response to the instructions. The method may include receiving instructions in response to the communication, and continuing to continuously detect the at least one of user locations, user movements, and user activities.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

Figure 1:
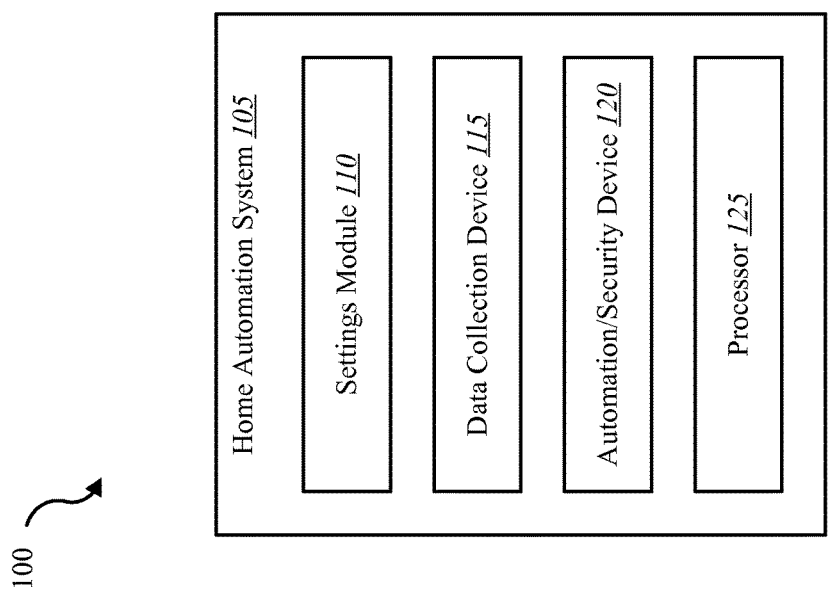
FIG. 1 is a block diagram of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to automation and security systems, such as home automation and home security, and related security systems and automation for use in commercial and business settings. More specifically, the systems and methods described herein relate to home automation systems, which may include security capabilities and provide access and/or control of security features for a home or commercial settings. Home automation system may be referred to as or include features of automation systems, security systems, and/or monitoring systems.

The systems and methods disclosed herein may relate to controlling features and functionality of a home and/or home automation system based at least in part on behavior of one or more users of a home automation system or occupants of a property being monitored by a home automation system. The term "user" may include owners, occupants, guests, customers, etc. of a home or other property. The home automation system may include at least one data collection device that monitors and/or collects data related to the user's behavior. The home automation system may also include a settings module that adjusts one or more automation/security devices or features associated with a property being monitored by the home automation system. The automation/security devices may include, for example, HVAC equipment, lighting, appliances, alarms, locks, sensors, cameras, and the like. The data collected about user behaviors may, collectively, produce a high level of certainty concerning what activities the user is engaged in and what the user intends for the home automation system to do in response to their behavior/activates. In one example, the home automation system, via data collected from at least one data collection device, may determine that a cell phone is plugged in for charging in a certain room of a home, appliances like TV's are turned off, and there is no motion detected in the home. The system also confirms a time of day that this data is collected (e.g., after 10:00 p.m.) and is able to determine with a high level of certainty that the user has gone to bed. The system then operates automation/security devices and/or systems of the home automation system, for example, to adjust a thermostat setting, turn off lighting, and arm a security feature according to predetermined rules or settings established by a user for that time of day (e.g., after 10:00 p.m.) and activity (e.g., gone to bed).

In another example, the user carries a geo-sense device (e.g., an app loaded on their cell phone) that the home automation system uses to track a location of the user. The home automation system may learn over time that the user commutes to a work location that is remote from the home on days Monday through Friday each week and resides at that place of business between approximately the hours of 8:00 a.m. and 5:00 p.m. When the system identifies departure of the user during daytime hours on one of those days, the home automation system may be adjusted into an "away from home" mode with certain lighting, thermostat settings, and security settings. When the system identifies that the user is leaving their place of business and returning home, the system may initiate an "occupy" mode based at least in part on a distance the user is from the home and an associated estimated amount of time of arrival. The system may be able to calculate an amount of time required to change a temperature within the home based on a number of factors such as, for example, the outdoor temperature, the existing indoor temperature, and the performance rating of an HVAC device for the home.

The home automation system may be operable to provide maximum energy efficiency and security measures while providing a desired level of comfort and security for the user. For example, the system may turn off most if not all of the lights of the home while the user is away, and turn on the interior and exterior lighting of the home when the user is traveling toward home and is determined to be within a predetermined distance of the home. The system may maintain the security features in an on and active state while the user is away, and turn off security features when the user is determined to be within a predetermined distance from the home or when a feature such as a garage door opener is actuated. The system may be able to adjust a temperature of the home based on another determined distance of the user relative to the home (e.g., a distance in which an estimated time of arrival is 20 minutes and the estimated time to raise or lower a temperature to an occupy condition is 20 minutes given current conditions).

The home automation system may operate substantially independently of user input as part of determining patterns of behavior and automatically adjusting settings, as discussed above. Alternatively, the home automation system may utilize at least some types of user input in the form of notices, instructions, feedback, or the like that are intentionally provided by one or more users. The user input may include, for example, an indication that the user intends to perform a certain action such as departing the property being monitored by the home automation system. The home automation system may be pre-programmed to perform certain functions in response to determining that the action has occurred or has not occurred within a predetermined time period. In one example, a user may indicate that he is leaving the property, and the home automation system is programmed to perform an action such as arming a security feature, locking a door, adjust lighting, or adjust an appliance setting when the user's detected behavior indicates that he has left the property. If the user's behavior indicates that he has not left the property within a predetermined time period, the home automation system may communicate with the user and/or automatically perform certain functions (e.g., deactivate a mode in which the home automation system is searching for user behavior that indicates his departure).

The user's manual input about his intended actions may prompt initiation of a mode or state for the home automation system in which the system monitors for specific user behavior or a sequence of behaviors that indicate whether the user has performed the intended action. The communications with the user may include, for example, inquiries about the user's current intentions related to the intended action, or messages informing the user of the automated actions that will be taken by the home automation system if the intended action is not performed (e.g., turn off an active mode in which the system is monitoring for user behavior specific to the intended action).

The user's manual input about his intended actions may prompt initiation of a mode or state for the home automation system such as, for example, an armed security state. The armed security state may include an ignore phase in which certain actions may be taken on the property without triggering an alarm condition. For example, during the ignore phase, a user may operate certain doors, windows, and appliances of the house without triggering an alarm condition. The ignore phase may be active until the home automation system determines with some predetermined level of certainty that the user has performed the intended action (e.g., left the property), or until the ignore phase is terminated based on a determination that the user has not performed the intended action within a predetermined time period or based on user feedback about a change in intended actions. The location and type of activity permitted during the ignore phase may be customized for a given property and/or user. Each type and/or location of an activity may be ranked according to a level of certainty or probability that activity and/or location confirms that the intended activity has occurs.

In at least some embodiments, the systems and method of the present application may automatically de-activate (e.g., disarm a security setting) a setting or feature if the system does not confirm an intended action has occurred, as opposed to known systems that maintain an active state or setting (e.g., armed state) regardless if the user's actual behavior matches an expected behavior (e.g., the user actually leaves the property within a delay period after arming the system at the time of leaving).

FIG. 1 is a block diagram illustrating one example of an environment 100 in which the present systems and methods may be implemented. In some embodiments, the systems and methods described herein may be performed on a home automation system 105 (e.g., an automation system, a security system, or monitoring system for use with a home and/or business). The home automation system 105 may include a settings module 110, at least one data collection device 115, at least one automation/security device 120, and a processor 125.

Settings module 110 may receive data from data collection device 115 and cooperate with processor 125 to determine a user's behavior or intended functionality for the automation/security devices 120 of home automation system 105. Settings module 110 may command or instruct operation of automation/security device 120 to provide the automation/security functionality based on the user's behaviors. A plurality of data collection devices 115 may be implemented to determine different behaviors of a user. Data collection device 115 may include a plurality of sensors, cameras, tracking devices, feedback mechanisms, and the like to collect data about a user's behavior inside and/or outside a home (e.g., any building or premises monitored by home automation system 105). The sensors may include, for example, a camera sensor, an audio sensor, a forced entry sensor, a shock sensor, a proximity sensor, a boundary sensor, an appliance sensor, a light fixture sensor, a temperature sensor, a light beam sensor, a three dimensional (3-D) sensor, a motion sensor, a smoke sensor, a glass break sensor, a door sensor, a window sensor, a carbon monoxide sensor, an accelerometer, a global positioning system (GPS) sensor, a Wi-Fi positioning system sensor, a capacitance sensor, a radio frequency sensor, a near field sensor, a heart beat sensor, a breathing sensor, an oxygen sensor, a carbon dioxide sensor, a brain wave sensor, a movement sensor, a voice sensor, a touch sensor, and the like. The cameras may include video and still shot image devices. The camera may be integrated with one or more sensors.

The data collection device 115 may include other types of data collection devices such as, for example, data manually input by a user via, for example, a control panel, mobile computing device, desktop computing device, navigation system, gaming system, or appliance (e.g., television, HVAC, and the like). The data collection device 115 may also include devices that measure, for example, energy usage, water consumption, and energy generation (e.g., via solar, wind, geo-thermal or the like).

In one example, data collection device 115 receives instructions about one or more users. Data collection device 115 may receive an indicator or input from one or more users related to the user's intended actions. For example, a user may provide a manual input via one or more data collection devices 115 indicating that the user plans to leave the property being monitored by the home automation system 105. The home automation system 105 may enter into an active mode after receiving the manual input from the user. The active mode may include monitoring for specific behaviors that may indicate whether the user has left the property. The active mode may include continuously detecting behavior of the user and/or determining patterns of behavior that may indicate that the intended action has occurred.

The home automation system 105 may be pre-programmed to automatically perform certain tasks (e.g., arm the system, lock doors, turn on/off lights, etc.) when the user is confirmed to have left the property or performed any other intended action. Other features of home automation system 105 may determine, based at least in part on monitored behavior of the user, whether the user has actually departed from the property within a predetermined time period. The monitored behavior may include, for example, turning on/off lights, opening or closing a door or window, logging off a computer, adjusting a thermostat, operating a garage door, operating a door lock, transmitting a geo location signal, or the like. The occurrence or sequence of monitored behavior may provide an indication as to whether the intended action indicated by the user has actually occurred (e.g., via data collection device 115). An example sequence of behavior may include turning off interior lights, followed by operating an exterior door, followed by operating a garage door. If the user's behavior indicates that the action has occurred (e.g., within a predetermined time period), home automation system 105 may automatically perform the predetermined tasks.

In the event the action does not occur within a predetermined time period, home automation system 105 may attempt to communicate with the user (e.g., via data collection device 115 or other device such as a handheld mobile device carried by the user or a control panel or other user interface of home automation system 105) or automatically perform certain tasks. The communication to the user may include, for example, an audible message delivered via a control panel or speaker system of the home automation system 105, or a text message displayed on the control panel or a handheld mobile device or other computing device carried by or otherwise accessible to the user. The communication may include a message such as, "are you still located at the property?", "you do not appear to have left the property, when do you expect to leave?", "please confirm your expected time of departure," or "the action you requested will be canceled if you do not leave the property within 2 minutes." The predetermined tasks may include, for example, automatically arming or disarming a security feature or the like. In some examples, the home automation system exits an active mode if the user's behavior indicates that the user has not departed or performed the actions indicated by the user within a predetermined time period. The predetermined time period may be in the range of, for example, about 30 seconds to about 5 minutes, and more particularly about 1 minute to about 3 minutes.

In another example, the system enters an active state such as an armed security state when the user indicates an intended action such as leaving the property being monitored by the home automation system. The system may currently initiate an ignore mode or state, which is maintained until the system determines that the user has either performed the intended action or has changed his intent to perform the intended action. Typically, the ignore mode is maintained for a predetermined time period, which may include an amount of time required to communicate with the user about whether he intends to perform the action after the system has determined that the action has not occurred within a first period of time. During the ignore mode, the system ignores certain actions that occur on the property that would otherwise trigger an alarm when the system is in an armed state. For example, the system may ignore actions such as operating certain doors or windows of a house, moving within a given hallway or room of the house, operating a garage door or exterior gate, or operating an appliance or light fixture. The type of actions permitted during the ignore mode may be customized for a given property and/or user. The actions may be ranked according to the level of certainty that the intended action (e.g., leaving the property) provides to the system. For example, a geo location signal indicating the user is a mile away from the property may provide greater certainty that the user has left the property than turning off lights and adjusting a thermostat. In another example, operating a garage door after an exterior door adjacent the garage has been operated may provide a higher level of certainty that a user has left a property than a lack of motion detection for a 15 minute time period. Once the system determines with a certain level of probability or certainty that the intended action has occurred, the ignore state may be terminated. If the desired level of certainty has not been reached within a predetermined time period, the system may attempt to obtain input from the user about the intent to perform the intended action. In other embodiments, if the desired level of certainty has not been reached within a predetermined time period, the system may automatically disarm or perform some other action with the assumption that the intended action will not be performed at that time. The system may inform the user that the action is being taken prior to or after the automatic action is taken.

In some embodiments, the system determines whether an intended action by the user has taken place (as indicated by the user) based on a pre-determined activity detected by the system. The pre-determined activity may be based on, for example, at least one of a geo-fence signal, a door or window operation sensor signal, a motion sensor signal, or an appliance and/or light fixture operation. If any of the pre-determined activities are not detected (e.g., within a given time period) but other activities are detected that may indicate that the user has either performed or not performed the intended action, the system may generate an inquiry for the user related to the other activities (e.g., before sounding an alarm, adjusting a setting of the system, determining that the intended activity has or has not been completed, etc.).

The data collected by data collection device 115 may be stored locally with the home automation system 105, or may be stored remotely via, for example, a back end system available via a network. Settings module 110 may determine trends based on the data received from data collection device 115. Settings module 110 may also "learn" from the history of behaviors of a user based on the data received from the data collection device 115. The historical data collected by data collection device 115 may be made available for the user to review and create settings for rules that are automatically carried out by home automation system 105 at various times of the day, on certain days of the week, or based on certain activities or behaviors of a user at any given time.

The home automation system 105 may be particularly useful in adjusting an HVAC setting of a home based on a user's behavior. The data collection device 115 may help determine if there are people in the home, and if so, the system may infer that the home is in an active state. The HVAC device may be the automation/security device 120 that is actuated by settings module 110 to warm or cool the house based on which people are in the home, the activity level of those persons, the time of day, etc. In one example, if the data collection device 115 indicates that the people are in an active state rather than motionless in their bedroom (e.g., a sleeping state), the HVAC setting may be different and/or adjusted accordingly. The data collection device 115 may include GPS data, motion detectors, cameras, accelerometers, etc. to infer if the people are in the home and performing a certain activity (e.g., watching TV in a family room, sleeping in bed, cooking in the kitchen, working at a desk, etc.). By collecting a sufficient number of data points, the settings module 110 may determine with a high level of certainty what activity the user is participating in and then automatically adjust the HVAC system in view of that activity. In one example, the HVAC system may be essentially shut off (e.g., a sleep state) when it is determined that the home is vacant and the user is a sufficient distance away from the home or moving in a direction away from the home. As a result, a maximum amount of energy is saved while the HVAC system goes into a sleep state until it is determined that the user is returning home and will arrive within a certain amount of time. Other automatic functions may occur relative to the HVAC system based on, for example, a determination that the user is in bed for the night versus other activities while the home is occupied or unoccupied.

Figure 2:
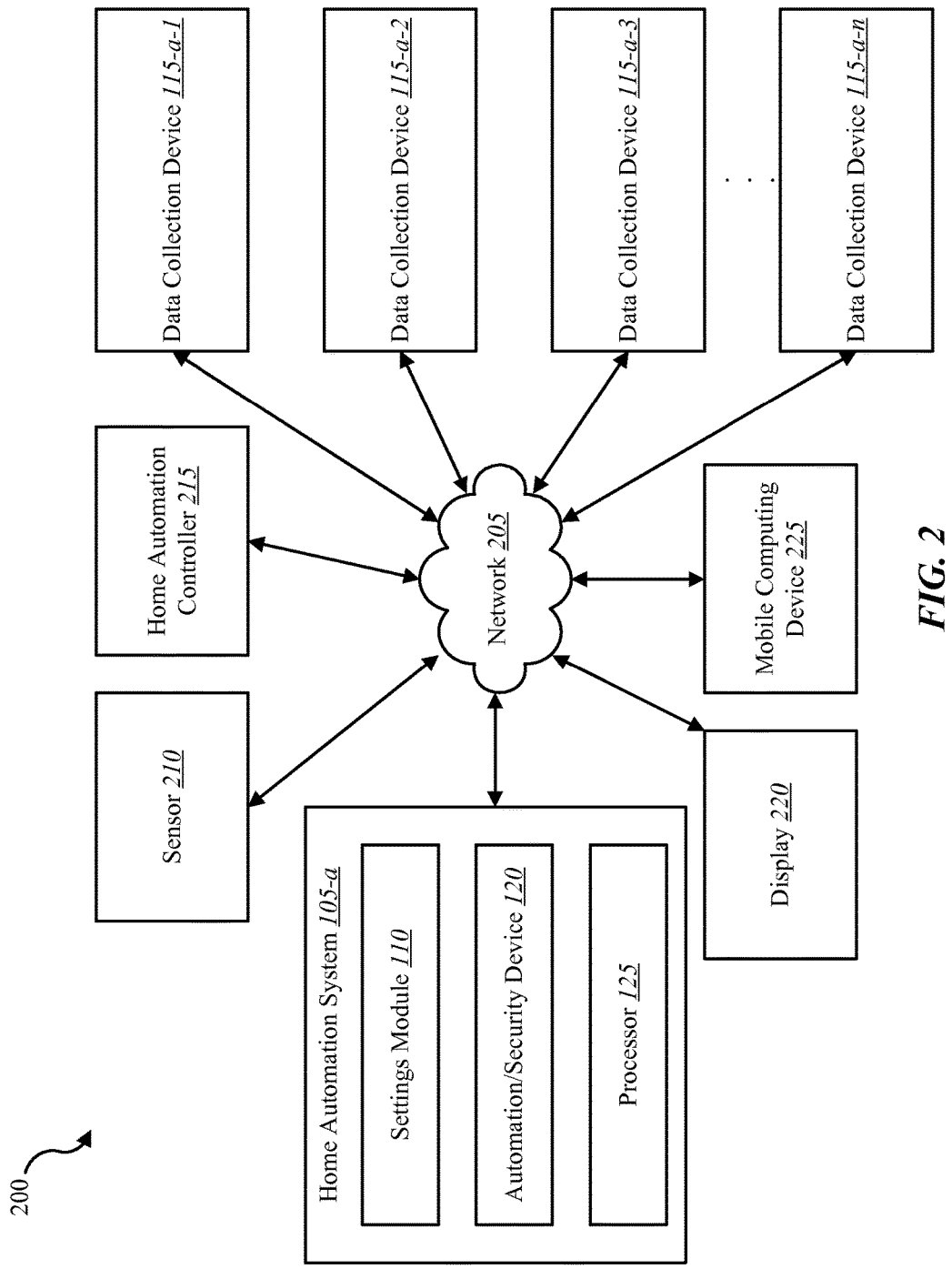
FIG. 2 is a block diagram of another environment in which the present systems and methods may be implemented.

Referring now to FIG. 2, in some embodiments, an environment 200 may include the components of environment 100 described above, and may further include a plurality of data collection devices 115-a and a number of additional features associated with a home automation system 105-a. Home automation system 105-a may be an example of home automation system 105 illustrated in FIG. 1. Data collection devices 115-a may be examples of data collection device 115 illustrated in FIG. 1. The home automation system 105-a may include settings module 110, automation/security device 120, and processor 125. Environment 200 may also include a sensor 210, an automation controller 215, a display 220, and a mobile computing device 225. A network 205 may interconnect home automation system 105-a with other features of environment 200. Network 205 provides communication via, for example, wired or wireless connections. Further, network 205 may include a plurality of communication mediums.

The plurality of data collection devices 115-a may collect and/or receive various types of data and information related to one or more users' behavior. The data and/or information may be automatically collected or may be manually or otherwise intentionally input by one or more users. The collected data and information may be delivered to settings module 110 via network 205. In at least some examples, sensor 210 may include at least one of the data collection devices 115-a, or any one of the data collection devices 115-a may include sensor 210. Settings module 110 may receive information and data from at least one of data collection devices 115-a, sensor 210, automation controller 215, display 220 and/or mobile computing device 225 as part of determining behavior of at least one user and commands for operation of automation/security device 120. Data collection devices 115-a may be positioned within a home or other premises monitored by home automation system 105-a, carried by one or more users, mounted in a transportation device (e.g., vehicle, bicycle, or the like), connected to a mobile piece of equipment (e.g., sports equipment, occupational tools, and the like), operable with an appliance, or connected to another object such as a pet. Data collection devices 115-a may be the same type of data collection device programmed for each of a plurality of users. In other examples, data collection devices 115-a may include a plurality of different data collection devices associated with one or more user.

Sensor 210 may represent one or more separate sensors or a combination of two or more sensors in a single sensor device. For example, sensor 210 may represent one or more camera sensors and one or more motion sensors connected to environment 300. Additionally, or alternatively, sensor 210 may represent a combination of sensors such as both a camera sensor and a motion sensor integrated into the same sensor device. Although sensor 210 is depicted as connected to home automation system 105-a via network 130, in some embodiments, sensor 210 may be connected directly to home automation system 105-a. Additionally, or alternatively, sensor 210 may be integrated into a home appliance or fixture such as a light bulb fixture. Sensor 210 may include an accelerometer to enable sensor 210 to detect movement of a user. Sensor 210 may include a wireless communication device with enables sensor 210 to send and receive data to and from one or more devices in environment 300. Additionally, or alternatively, sensor 210 may include a GPS sensor to enable sensor 210 to track a location of sensor 210. Sensor 210 may include a proximity sensor to enable sensor 210 to detect proximity of a user relative to a predetermined distance from a boundary (e.g. geo-fence). Sensor 210 may include one or more security detection sensors such as, for example, a glass break sensor, a motion detection sensor, or both. Additionally, or alternatively, sensor 210 may include a smoke detection sensor, a carbon monoxide sensor, or both. In at least some examples, sensor 210 may detect the presence of a user within a dwelling or in close proximity to a dwelling that is monitored by home automation system 105-a, perform certain functions (e.g., opening or closing a door or window), or speaking a voice command. As discussed above, sensor 210 may be integrated into any one of data collection devices 115-a or work in conjunction therewith to provide data to settings module 110 that represents various behavior of at least one user.

Automation controller 215 may provide features and functionality related to automation and/or security features of home automation system 105-a. Automation controller 215 may provide at least some of the logic, processing, and/or interaction among various components of home automation system 105-a. For example, automation controller 215 may include processor 125 or be included in processor 125. Automation controller 215 maybe operable to control at least in part the automation/security device 120 via, for example, instructions from settings module 110.

Display 220 may include, for example, a digital display as part of, for example, a control panel of home automation system 105-a. Display 220 may be provided via devices such as, for example, a desktop computer or mobile computing device 225. A user interface may be integrated into display 220. Such a user interface may include a plurality of menus, screens, microphones, speakers, cameras, and other capabilities that permit interaction between the user and home automation system 105-a or any other components of environment 200. Additionally, or alternatively, the user interface with display 220 may be integrated into mobile computing device 225, data collection devices 115-a, or other devices of environment 200. The user may input instructions and/or one or more intended actions via the user interface, mobile computing device 225, or other feature of environment 200. As discussed above, the intended actions may include, for example, the user's intent to leave the property being monitored by home automation system 105-a. The user's departure, as confirmed by, for example, data collection devices 115-a and/or sensor 210, may trigger certain automatic actions to be initiated by home automation system such as, for example, arming a security feature, turning on/off lights, operating a thermostat, etc. In some embodiments, the user's indication to perform a certain action may initiate an automated action by the home automation system such as arming a security feature and/or initiating an ignore or delay state for the home automation system that remains active until the system determines that the intended action has been completed or confirms that the user no longer intends to perform the intended action.

In some embodiments, mobile computing device 225 may include one or more processors, one or more memory devices, and/or a storage device. Examples of mobile computing device 225 may include DVRs, personal video recorders (PVRs), and/or mobile computing devices, smart phones, personal computing devices, servers, etc. Home automation system 105-a may communicate with mobile computing device 225 based in part on any of the data collected by data collection device 115-a, decisions of settings module 110 related to control of automation/security device 120, or the like so that a user is aware of, for example, a current state, changing state, or activity associated with home automation system 105-a.

Figure 3:
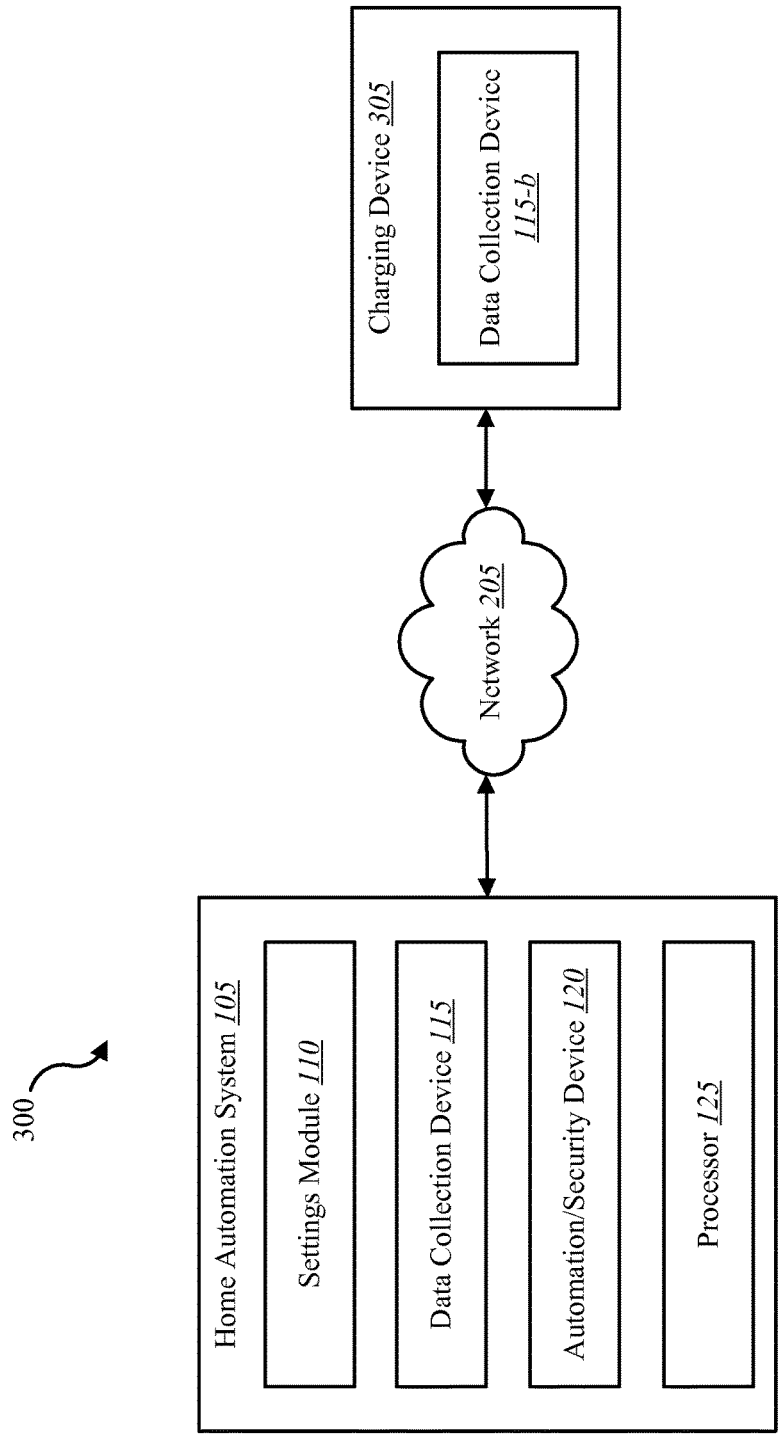
FIG. 3 is a block diagram of another environment in which the present systems and methods may be implemented.

FIG. 3 illustrates another environment 300 that may include some components of environment 100 described above, and may further include a charging device 305 having at least one data collection device 115-b. Charging device 305 communicates with home automation system 105 via network 205. Operation of charging device 305 and/or data collection device 115-b may correspond with a particular behavior of the user.

In one example, charging device 305 is used to charge one or more of the user's electronic devices (e.g., a cell phone, laptop, or tablet computer). Data collection device 115-b may operate to provide information related to when and where charging device 305 is being operated. In one scenario, charging device 305 is operated in a user's bedroom, home automation system 105 determines that charging device 305 is operated during certain times of the day (e.g., after 12:00 p.m. and before 6:00 a.m.), and settings module 110 may ascertain with a high level of certainty that the user has chosen to go to bed. Settings module 110 may then update a setting of automation/security device 120 according to a nighttime setting (e.g., turn off lights, adjust HVAC setting, arm security system, etc.).

In at least some examples, data collection device 115-b is operated via the electronic device being charged. For example, data collection device 115-b may include or be incorporated into a downloadable app carried on the electronic device. The app generates a signal that is received by settings module 110 indicating that the electronic device is being charged via charging device 305.

In another example, data collection device 115-b includes a power consumption indicator that monitors the power being drawn by charging device 305, which indicates its use in charging a device. Data collection device 115-b may send data to settings module 110 indicating charging device 305 is in use rather than just being plugged into a socket. For example, data collection device 115-b may include a sensor associated with the socket into which the charging device 305 is plugged. Data collection device 115-b may be interposed between the socket and the plug for charging device 305.

In a further example, charging device 305 is a charging pad and includes data collection device 115-b integrated into charging device 305. The charging pad may charge the electronic device by simply setting the electronic device on top of or in contact with a surface of charging device 305, or in close proximity to a charging feature of charging device 305. Charging device 305 may include wired or wireless charging of an electronic device. Data collection device 115-b may communicate information about the charging event to settings module 110 after initiating charging of the electronic device.

Other features of environment 300 may help determined the location of charging device 305 (e.g., in a bedroom during nighttime hours indicating that the user is sleeping, or in an office during daytime hours indicating the user is working). In other examples, data collection device 115-b may provide information about a location of the charging device as well as the operation state of charging device 305.

While FIG. 3 illustrates a charging device 305 having a data collection device 115-b, other examples may include other types of devices whose operation may indicate certain behaviors of a user, particularly when combined with other data received by settings module 110. For example, a device that indicates a Wi-Fi connection or Wi-Fi usage is occurring, usage of a satellite television connection, operation of a hot water heater, operation of a kitchen appliance, door opener (e.g., garage door opener), operation of outdoor or indoor lighting, and the like may each involve a data collection device that provides information related to the usage of the device and corresponding behavior of the user.

Figure 4:
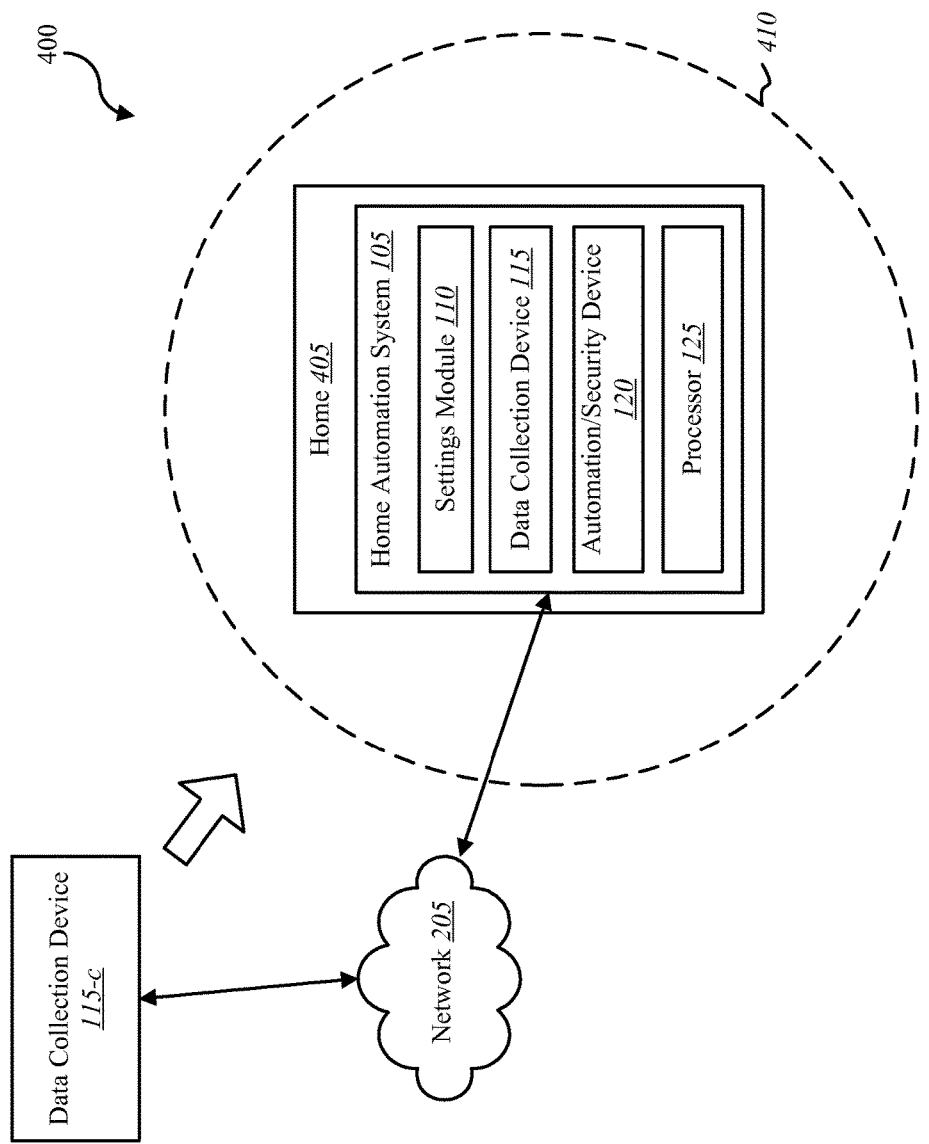
FIG. 4 is a block diagram of another environment in which the present systems and methods may be implemented.

FIG. 4 illustrates an environment 400 that may include the components of environment 100 described above, and may further include a home 405 within which home automation system 105 operates, a geo-boundary 410 (e.g., geo-fence), network 205, and a data collection device 115-c. Data collection device 115-c may be one example of data collection device 115 illustrated in FIG. 1 and included in home automation system 105.

Data collection device 115-c may include a tracking or positioning feature such as a GPS sensor and/or near field communication feature. Home automation system 105 may operate at least in part based on the proximity of data collection device 115-c relative to boundary 410 and/or home 405. Additionally, or alternatively, a direction of movement of data collection device 115-c or a speed of movement relative to boundary 410 and/or home 405 may be received by settings module 110 and used to determine operation of automation/security device 120 or other features of home automation system 105.

In one scenario, data collection device 115-c includes geo-sense capability (e.g., GPS) and is carried by an occupant of home 405, or is carried by the occupant's vehicle, equipment, etc. Home automation system 105 determines when the data collection device 115-c has left the premises of home 405 and/or boundary 410. Once the location of the occupant is confirmed as being away from home 405, settings module 110 may operate one or more automation/security devices 120 in accordance with an "away from home" or "daytime" mode preprogrammed by the user. In one example, the automation/security device 120 is an HVAC system that increases or decreases the temperature of home 405. Other features that may be adjusted include, for example, lighting, security settings, sensor settings, appliance settings, and the like. When home automation system 105 recognizes that data collection device 115-c is returning towards home 405 and/or boundary 410, or moves within a certain distance of home 405 or boundary 410, settings module 110 may operate automation/security device 120 into a different setting or mode (e.g., "daytime occupy mode"). For example, data collection device 115-c may indicate that the user is at a place of business and generally stationary for regular work hours (e.g., 8:00 a.m. to 5:00 p.m.). When data collection device 115-c indicates that the user has left the place of business, is traveling in the direction towards home 405 or boundary 410, and/or moves within a certain distance of home 405 and/or boundary 410, settings module 110 may actuate automation/security device 120 (e.g., operate an HVAC system to change a temperature, turn on lighting, turn off security settings, etc.).

Home automation system 105 may operate an algorithm that is used to determine how much time is required to adjust a temperature of home 405 to a desired level based on, for example, the model and/or capacity of the HVAC system, the temperatures inside and outside of the home, other weather conditions, the size of the home, etc. Based on the output of that algorithm, the distance from home indicated by data collection device 115-c used to trigger operation of automation/security device 120 may change. For example, the algorithm may determine that it takes 20 minutes to adjust the house temperature from 65 degrees up to 72 degrees (e.g., the daytime occupy temperature) based on current conditions. The user may initially be an hour away from home 405. Home automation system 105 tracks the location of the user via data collection device 115-c until the user reaches a point that is about 20 minutes from arrival at home. Settings module 110 then operates the HVAC system to adjust the temperature. Settings module 110 may operate other automation/security devices 120 at different times relative to the estimated time of arrival of the user. For example, settings module 110 may operate lighting when the user is within one minute of arrival, may adjust security settings to an off state only after the user arrives home (e.g., operates a garage door opener or approaches an exterior door), and unlocks the door at another time.

At least one resultant outcome of these automated features is the potential for conservation of energy and improved ease of interaction between the user and the home. Energy is conserved because certain automation/security features of the home are operated only when needed and are automatically set at levels corresponding to when and how the home is in use. Further, the automated features disclosed herein require limited input and interaction from the user in order to obtain the efficient control of the automation/security features. The input from the various data collection devices help the system determine regular human behaviors that can provide enough indicators to help the system react automatically for the benefit of the user, while the user is able to avoid having to learn how to use a large portion of the systems functionality and/or user interface. In essence, the system learns how to work with the user and adjusts according to particular patterns of behavior for those who occupy the home.

The boundary 410 of environment 400 may be used for other applications and functions for home automation system 105. In one embodiment, a user may inform home automation system 105 that the user intends to depart home 405 or perform another intended action. The user may inform via, for example, a manual entry into a control panel of home automation system 105, a voice command via a voice activated system of home automation system 105, a command entered via data collection device 115-c or mobile computing device, or the like. Home automation system 105 may determine whether the user has crossed boundary 410 as part of determining whether the user has left home 405 or performed the intended action. Home automation system 105 may monitor other behaviors of the user as part of determining whether the user has departed home 405 or other property being monitored by home automation system 105 or performed the whatever other intended action where indicated by the user.

Once home automation system 105 determines that the user has departed or performed the intended action, home automation system 105 (e.g., via settings module 110) may perform automations functions such as, for example, arming a security feature, turning on/off lights, adjusting an appliance setting (e.g., thermostat), or the like.

If the user has not departed or performed the intended action within a predetermined time period (e.g., based on behavior of the user determined using data collection device 115-c or other feature of environment 400), home automation system 105 may take automated actions such as communicating with the user or canceling the user's intended action from the system.

The user may have the option at any time to cancel their plan to depart or perform whatever intended action they have indicated would be forthcoming. The canceled plans may be entered via, for example, data collection device 115-c, a user interface for home automation system 405, a handheld computing device, or the like.

Figure 5:
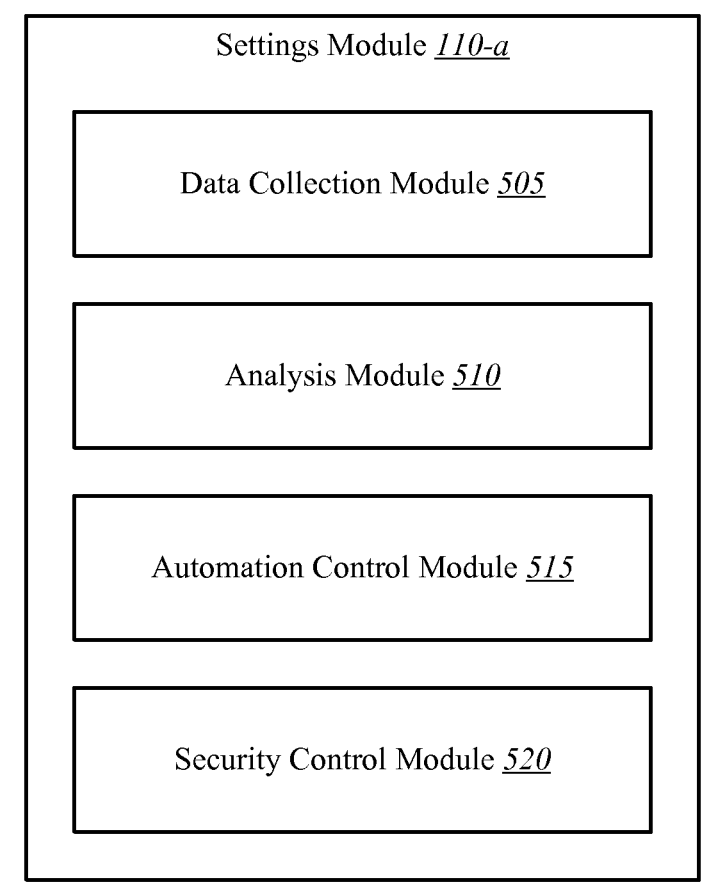
FIG. 5 is a block diagram of an example settings module of the environments shown in FIGS. 1-4.

FIG. 5 illustrates a block diagram of an environment 500 illustrating a settings module 110-a. Settings module 110-a may be one example of settings module 110 shown with reference to FIGS. 1, 2, 3 and/or 4. Settings module 110-a may include a data collection module 505, an analysis module 510, an automation control module 515, and a security control module 520.

The data collection module 505 may receive data from a number of sources including, for example, the data collection devices 115 described with reference to FIGS. 1-4. Data collection module 505 may receive data or information from other sources such as, for example, the sensor 210, automation controller 215, display 220, mobile computing device 225, and charging device shown in FIGS. 2 and/or 3. The data received by data collection module 505 may be received via a network (e.g., network 205 shown in FIGS. 2-4). The data received by data collection module 505 may be in various formats including, for example, sensor signals, manually input data, images, sounds, power consumption data, etc. The data received by data collection module 505 may be received from a plurality of different data collection devices or other devices and systems. The data collected by data collection module 505 may relate to one or more activities and/or behaviors of at least one user, occupant, guest or other person or object (e.g., pet) associated with a property such as a house or a commercial building.

Data collection module 505 may be configured to actively reach out to obtain certain data as opposed to passively accepting data from one or more sources. Data collection module 505 may include a plurality of separate modules carried on various devices and arranged for stationary or mobile use.

At least some of the data received by data collection module 505 may come from manual input by a user of the user's intended actions (e.g., departing a property being monitored by a home automation system, arming a security feature, adjusting an automation feature, or the like). The manual input may be received via, for example, a user interface, microphone, a display such as a touch screen, a mobile computing device, or the like.

Analysis module 510 may receive data from data collection module 505 and determine, via the data, what type of behavior and/or activity the users may be engaged in. Analysis module 510 may, based on such determined behaviors/activities, determine whether further action is required related to automation/security features of the home automation system. In at least one example, analyzed data provided by analysis module 510 may be reviewed by automation control module 515. Automation control module 515 may generate instructions for operating at least one automation device or device, feature or functionality of a home automation system. The analyzed data from analysis module 510 may be received by security control module 520, which determines which, if any, security device, feature or functionality of the home automation system should be operated. Analysis module 510 may perform at least some comparison of current collected data to past collected data, aggregate data received from a plurality of different sources, compare collected data to benchmark data to determine if a threshold is met, and the like.

In at least some examples, analysis module 510 determines whether the user has left the property after the user has indicated an intent to leave the property. In other examples, analysis module 510 determines whether the user has performed some other function or action after the user has indicated to the home automation system that the user intends to perform that function or action. The analysis module 510 may determine whether the user has performed a given action or function within a given time period after the user indicates an intent to perform such actions or functions. The time period may be predetermined and/or modified by the user or pre-programmed at the time of installation or manufacture of the home automation system or portions thereof. The time period may be reset based on additional feedback from the user. The reset time period may be referred to as a second predetermined time period.

Settings module 110-a may operate in conjunction with a processor or controller (e.g., processor 125) of a home automation system as part of collecting data via data collection module 505, analyzing data via analysis module 510, or generating instructions related to automation/security devices via automation control module 515 or security control module 520. Settings module 110-a may include more or fewer modules and capabilities than other embodiments such as, for example, a database module that includes storage of proposed settings, rules, past data, etc. that may be considered by analysis module 510 or other aspects of settings module 110-a.

Settings module 110-a may operate according to a plurality of criteria or rules, wherein at least some of the criteria or rules relate to the monitored behavior used to determine whether a user has left a property after the user indicates his intent to leave the property (i.e., with the expectation that the home automation system will perform certain actions such as arming a security feature automatically after the user departs). The adjustment of settings may be set for a limited time or may be a permanent setting change.

Figure 6:
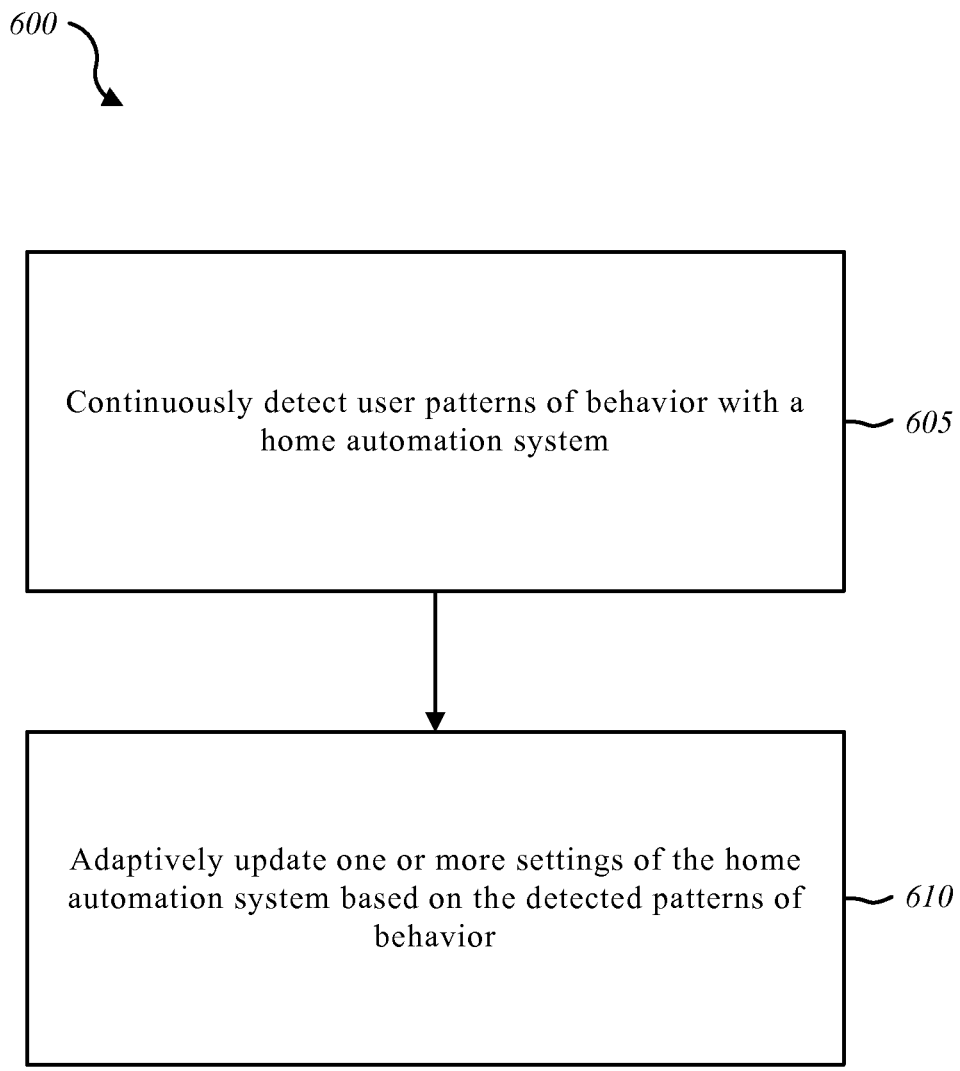
FIG. 6 is a flow diagram illustrating a method for controlling settings of an automation system.

FIG. 6 is a flow diagram illustrating one embodiment of a method 600 for controlling settings of a home automation system based at least in part on user behavior. In some configurations, the method 600 may be implemented by the settings module 110-a of home automation system 105 shown in FIGS. 1, 2, 3 and/or 4. In other examples, method 600 may be performed generally by home automation system 105 shown in FIGS. 1, 2, 3 and/or 4, or even more generally by the environments 100, 200, 300, 400 shown in FIGS. 1-4, respectively. In some configurations, method 600 may be implemented in conjunction with data collection devices 115 shown in FIGS. 1, 2, 3 and/or 4.

At block 605, method 600 includes continuously detecting user patterns of behavior with a home automation system. Block 610 includes adaptably updating one or more settings of the home automation system based on the detected patterns of behavior.

The user patterns of behavior of the method 600 may be detected within a home that is monitored by the home automation system. The user patterns of behavior may be detected outside of the home that is monitored by the home automation system. The detected pattern of behavior may be based at least in part on a geo-fence signal (e.g., GPS). The home automation system may include security features, and the one or more settings may include a security setting related to at least one of the security features. The one or more settings may include an HVAC setting. The one or more settings may include at least one light fixture setting of a home that is monitored by the home automation system. The method 600 may also include determining a location of the user and updating the HVAC setting based on an estimated time of arrival of the user to the house and a determined location of the user. The one or more settings may include at least one lock mechanism setting for a barrier.

Figure 7:
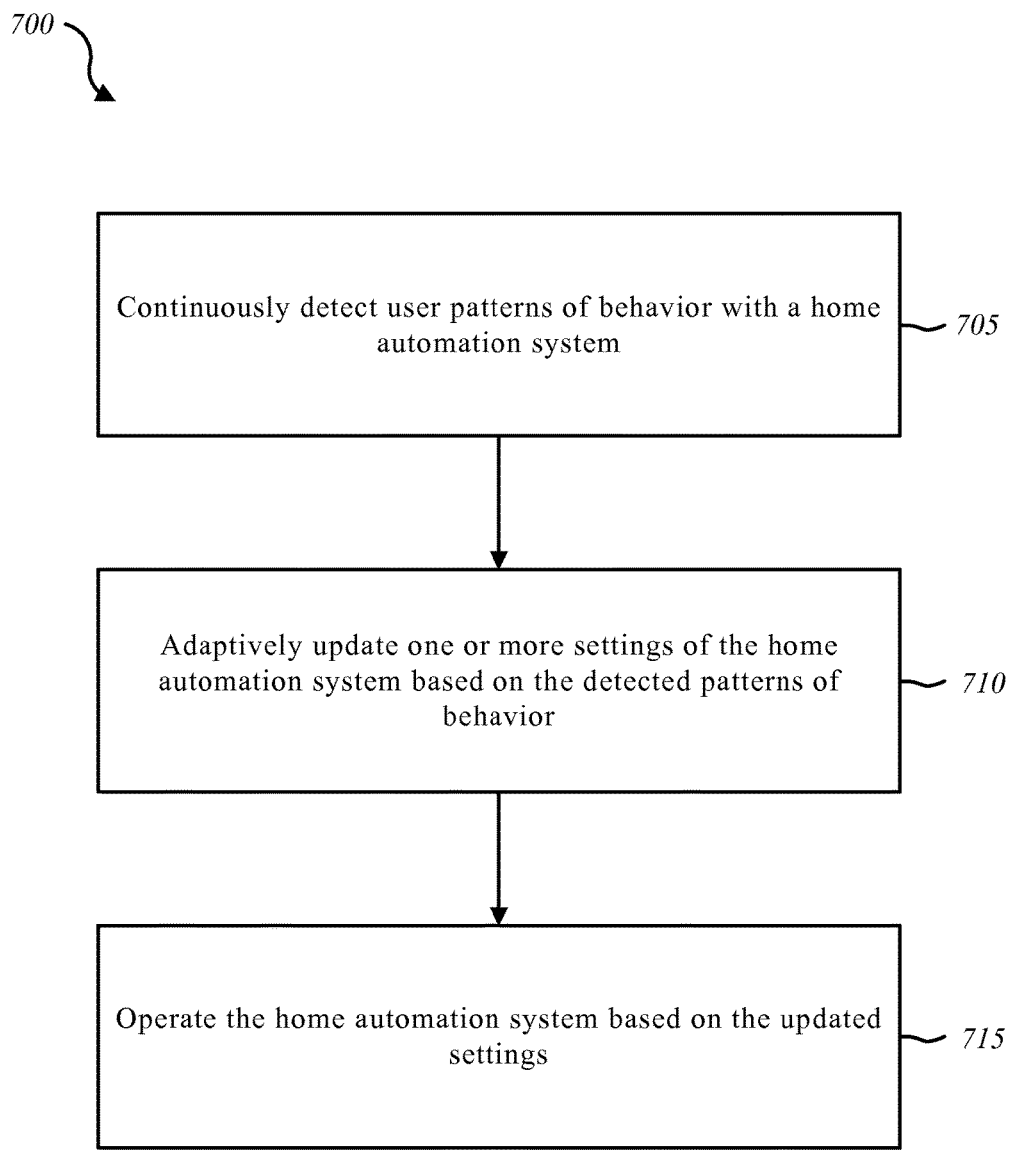
FIG. 7 is a flow diagram illustrating another method for controlling settings of an automation system.

FIG. 7 is a flow diagram illustrating one embodiment of a method 700 for controlling a home automation system based at least in part on a user's behavior. In some configurations, the method 700 may be implemented by the settings module 110 of home automation system 105 shown in FIGS. 1, 2, 3 and/or 4. In other examples, method 700 may be performed generally by home automation system 105 shown in FIGS. 1, 2, 3 and/or 4, or even more generally by the environments 100, 200, 300, 400 shown in FIGS. 1-4, respectively. In some configurations, method 700 may be implemented in conjunction with at least one data collection device 115 shown in FIGS. 1, 2, 3 and/or 4.

At block 705, method 700 includes continuously detecting user patterns of behavior with a home automation system. Block 710 includes adaptively updating one or more settings of the home automation system based on the detected patterns of behavior. At block 715, method 700 includes operating the home automation system based on the updated settings.

The patterns of behavior of the method 700 may be detected inside or outside a home being monitored by the home automation system. The one or more settings may control at least one of an HVAC system, a light fixture, and a lock mechanism. The home automation system may include at least one home security feature, and updating one or more settings may include updating the at least one home security feature. The user patterns of behavior may be detected using at least one of a motion sensor, an optical sensor, an infrared sensor, a power socket sensor, an appliance status sensor, and a light sensor.

Figure 8:
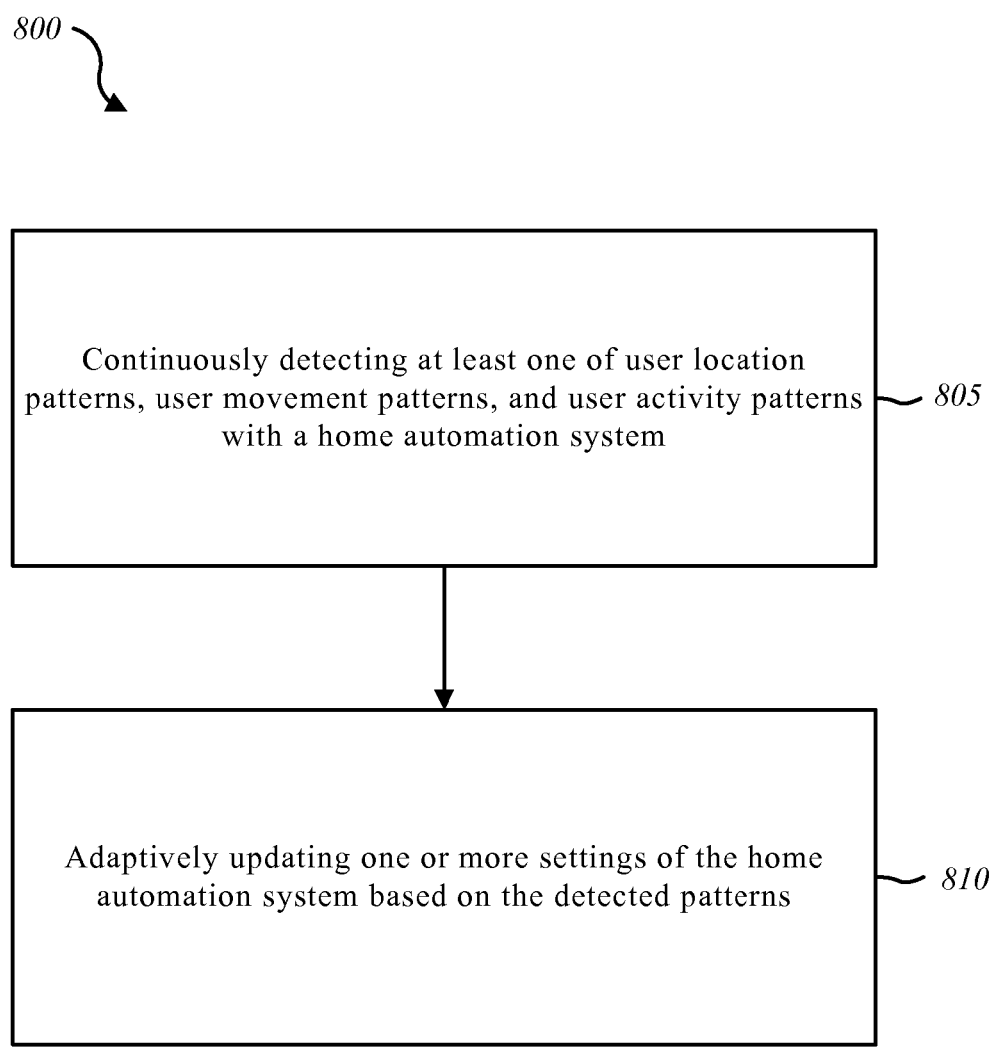
FIG. 8 is a flow diagram illustrating another method for controlling settings of an automation system.

FIG. 8 is a flow diagram illustrating one example of a method 800 for controlling settings of a home automation system based at least in part on user behavior. In some configurations, the method 800 may be implemented by the settings module 110 shown in FIGS. 1, 2, 3 and/or 4. In other examples, method 800 may be performed generally by home automation system 105 shown in FIGS. 1, 2, 3 and/or 4, or even more generally by the environments 100, 200, 300, 400 shown in FIGS. 1-4, respectively. In some configurations, method 800 may be implemented in conjunction with data collection devices 115 shown in FIGS. 1, 2, 3 and/or 4.

At block 805, the method 800 includes continuously detecting at least one of user location patterns, user movement patterns, and user activity patterns with the home automation system. Block 810 of method 800 includes adaptively updating one or more settings of the home automation system based on the detected patterns.

The method 800 may additionally include establishing operation rules for future control of the one or more settings based on the detected patterns. One of the detected user activity patterns may include operating at least one electronic device. The method 800 may include storing information about past detected patterns, and comparing information about current detected patterns to the information about past detected patterns. Method 800 may include correlating the detected user patterns of behavior with date and time of day data, wherein adaptively updating the one or more settings of the home automation system is based at least in part on the date and time of day data.

Figure 9:
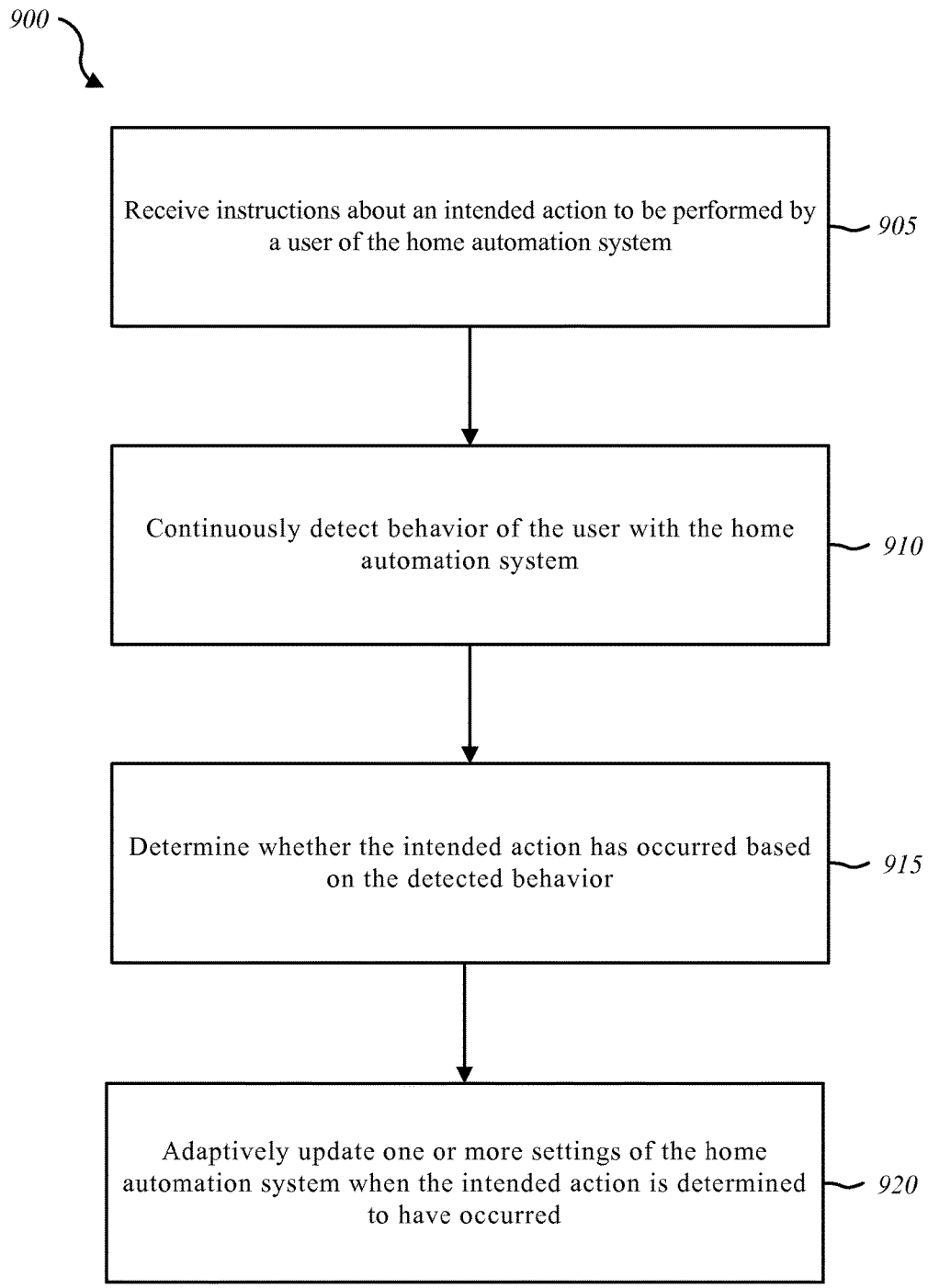
FIG. 9 is a flow diagram illustrating another method for controlling settings of an automation system.

FIG. 9 is a flow diagram illustrating one example of a method 900 for controlling settings of a home automation system based at least in part on user behavior. In some configurations, the method 900 may be implemented by the settings module 110 shown in FIGS. 1, 2, 3 and/or 4. In other examples, method 900 may be performed generally by home automation system 105 shown in FIGS. 1, 2, 3 and/or 4, or even more generally by the environments 100, 200, 300, 400 shown in FIGS. 1-4, respectively. In some configurations, method 900 may be implemented in conjunction with data collection devices 115 shown in FIGS. 1, 2, 3 and/or 4.

At block 905, the method 900 includes receiving instructions about a user of a home automation system (e.g., about an intended action to be performed by a user). Block 910 includes continuously detecting behavior of the user with the home automation system. Block 915 includes determining whether the intended action has occurred based on the detected behavior. At block 920, method 900 includes adaptively updating one or more settings of the home automation system when the intended action is determined to have occurred.

Method 900 may also include detecting the behavior of the user within a home monitored by the home automation system. The intended action may include departing a property being monitored by the home automation system and the detected behavior may indicate with a predetermined level of probability that the user has left the property. The behavior of the user may be based at least in part on a geo-fence signal, a door operation sensor signal, and a motion sensor signal. The home automation system may include security features, and the one or more settings of the home automation system includes a security setting related to at least one of the security features. The one or more settings of the home automation system may include at least one of an HVAC setting, at least one light fixture setting, at least one security setting, and at least one lock mechanism setting for a barrier. The instructions may be executable by the processor to communicate with the user if the intended action has not occurred within a predetermined time period. The instructions may be executable by the processor to initiate an active state after receiving the instructions, wherein the active state includes prompting the continuously detecting of the behavior of the user, and canceling the active state if the intended action does not occur within a predetermined time period. The instructions may be received via at least one of a control panel of the home automation system and a mobile computing device.

Figure 10:
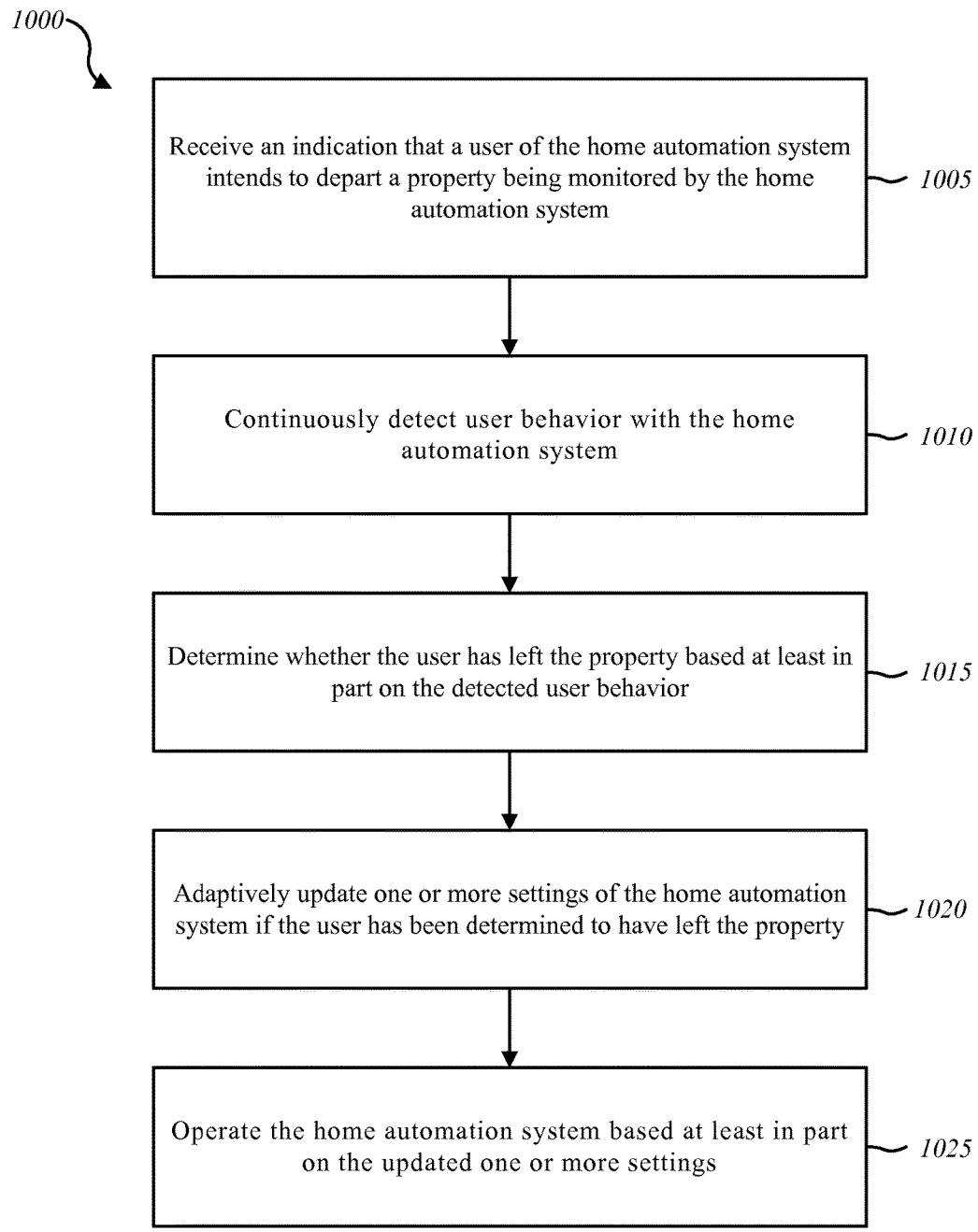
FIG. 10 is a flow diagram illustrating another method for controlling settings of an automation system.

FIG. 10 is a flow diagram illustrating one example of a method 1000 for controlling settings of a home automation system based at least in part on user behavior. In some configurations, the method 1000 may be implemented by the settings module 110 shown in FIGS. 1, 2, 3 and/or 4. In other examples, method 1000 may be performed generally by home automation system 105 shown in FIGS. 1, 2, 3 and/or 4, or even more generally by the environments 100, 200, 300, 400 shown in FIGS. 1-4, respectively. In some configurations, method 1000 may be implemented in conjunction with data collection devices 115 shown in FIGS. 1, 2, 3 and/or 4.

At block 1005, the method 1000 includes receiving an indication from a user of the home automation system that the user intends to depart a property being monitored by the home automation system. Block 1010 includes continuously detecting user behavior with the home automation system. Block 1015 includes determining whether the user has left the property based at least in part on the detected user behavior. At block 1020, method 1000 includes adaptively updating one or more settings of the home automation system if the user has been determined to have left the property. Block 1025 includes operating the home automation system based at least in part on the updated one or more settings.

The behavior according to the method 1000 may include at least one of operating an exterior door, operating a light fixture, presence in a certain location of the property, and operating a garage door. The one or more settings may control at least one of a security feature, an HVAC system, a light fixture, and a lock mechanism. The instructions may be executable by a processor to generate a message for the user if the user has not departed the property within a predetermined time period. The message may include an inquiry concerning an intent of the user to depart the property. The message may be in the form of at least one of an audible message or a text message generated at a control panel of the home automation system, generated at an appliance of the property, or generated by a mobile computing device associated with the user. The instructions may be executable by a processor to receive instructions about a user, such as to cancel the indication.

Figure 11:
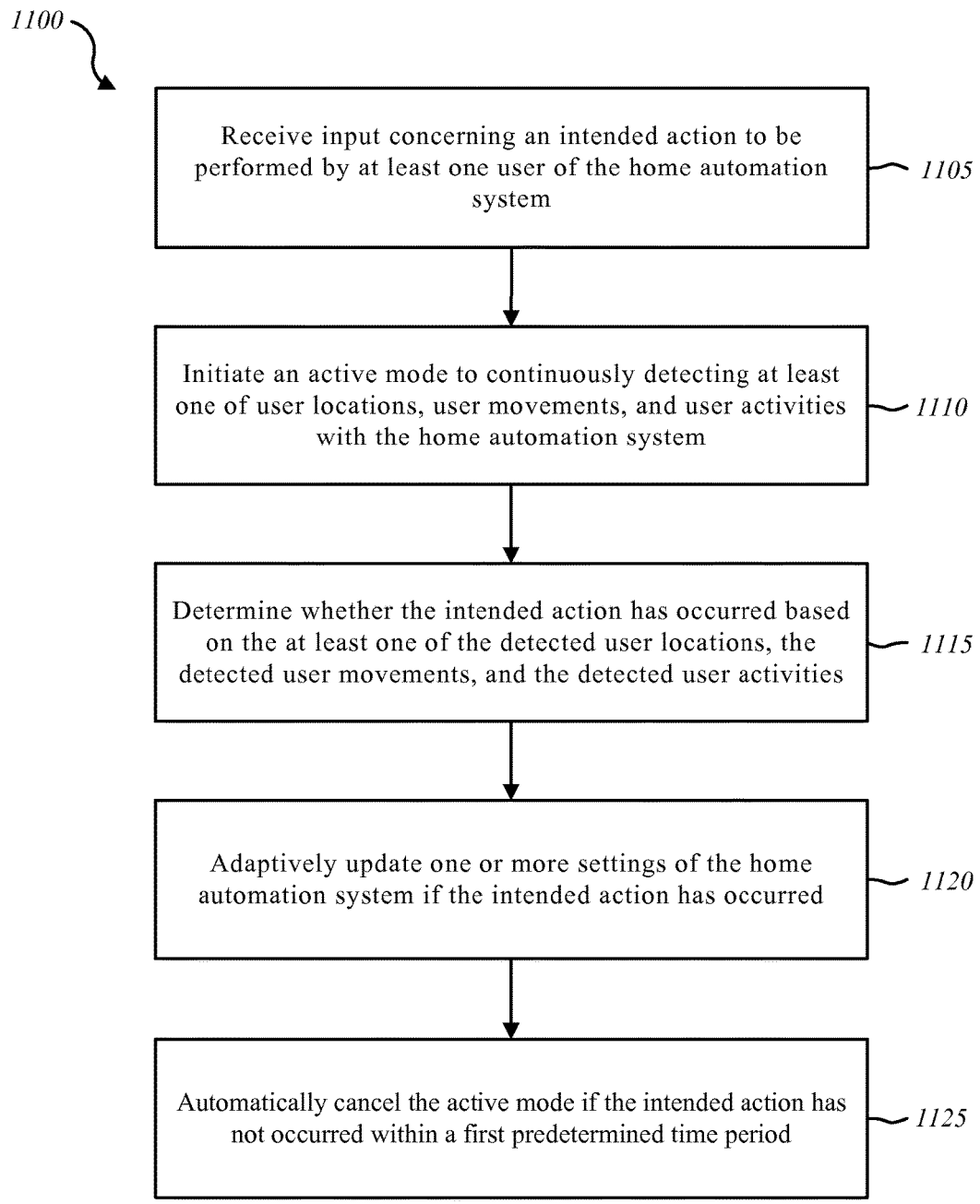
FIG. 11 is a flow diagram illustrating another method for controlling settings of an automation system.

FIG. 11 is a flow diagram illustrating one example of a method 1100 for controlling settings of a home automation system based at least in part on user behavior. In some configurations, the method 1100 may be implemented by the settings module 110 shown in FIGS. 1, 2, 3 and/or 4. In other examples, method 1100 may be performed generally by home automation system 105 shown in FIGS. 1, 2, 3 and/or 4, or even more generally by the environments 100, 200, 300, 400 shown in FIGS. 1-4, respectively. In some configurations, method 1100 may be implemented in conjunction with data collection devices 115 shown in FIGS. 1, 2, 3 and/or 4.

At block 1105, the method 1100 includes receiving input from a user concerning an intended action to be performed by at least one user of the home automation system. Block 1110 includes initiating an active mode to continuously detect at least one of user locations, user movements, and user activities with the home automation system. Block 1115 includes determining whether the intended action has occurred based on the at least one of the detected user locations, the detected user movements, and the detected user activities. At block 1120, method 1100 includes adaptively updating one or more settings of the home automation system if the intended action has occurred. Block 1125 includes automatically cancelling the active mode if the intended action has not occurred within a first predetermined time period.

Method 1100 may also include communicating with the user if the intended action has not occurred within a second predetermined time period that is less than the first predetermined time period. The method 1100 may further include receiving instructions about a user in response to, for example, communications with the user, and canceling the active mode in response to the instructions. The method 1100 may include receiving instructions about a user in response to, for example, communications with the user, and continuing to continuously detect the at least one of user locations, user movements, and user activities.

Figure 12:
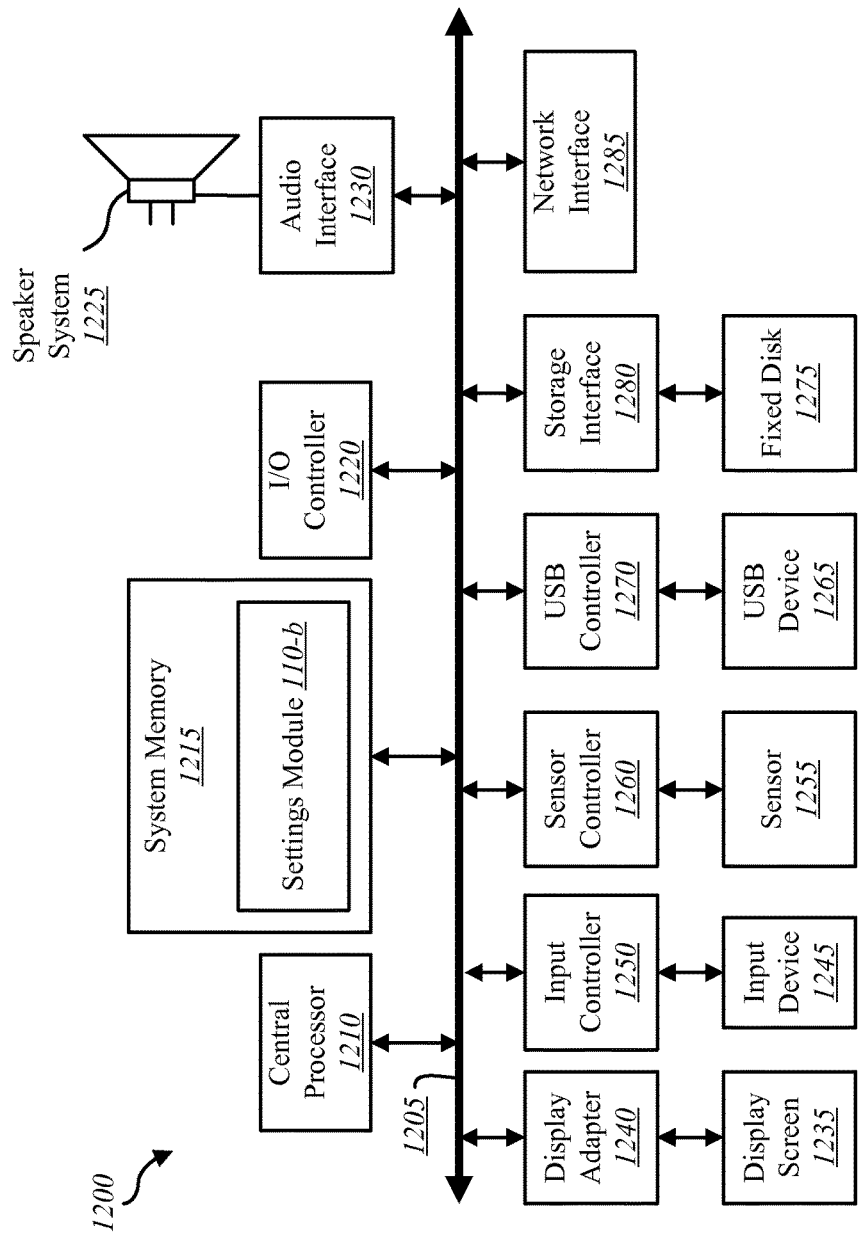
FIG. 12 is a block diagram of a computer system suitable for implementing the present systems and methods of FIGS. 1-11.

FIG. 12 depicts a block diagram of a controller 1200 suitable for implementing the present systems and methods. The controller 1200 may be an example of the home automation system 105, home automation controller 215, and/or mobile computing device 225, illustrated in FIGS. 1 and/or 2. In one configuration, controller 1200 includes a bus 1205 which interconnects major subsystems of controller 1200, such as a central processor 1210, a system memory 1215 (typically RAM, but which may also include ROM, flash RAM, or the like), an input/output controller 1220, an external audio device, such as a speaker system 1225 via an audio output interface 1230, an external device, such as a display screen 1235 via display adapter 1240, an input device 1245 (e.g., remote control device interfaced with an input controller 1250), multiple USB devices 1265 (interfaced with a USB controller 1270), and a storage interface 1280. Also included are at least one sensor 1255 connected to bus 1205 through a sensor controller 1260 and a network interface 1285 (coupled directly to bus 1205).

Bus 1205 allows data communication between central processor 1210 and system memory 1215, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a settings module 110-*b* to implement the present systems and methods may be stored within the system memory 1215. The settings module 110-*b* may be an example of the settings module 110 illustrated in FIGS. 1, 2, 3 and/or 4. Applications resident with controller 1200 are generally stored on and accessed via a non-transitory computer readable medium, such as a hard disk drive (e.g., fixed disk 1275) or other storage medium. Additionally, applications can be in the form of electronic signals modulated in accordance with the application and data communication technology when accessed via interface 1285.

Storage interface 1280, as with the other storage interfaces of controller 1200, can connect to a standard computer readable medium for storage and/or retrieval of information, such as a fixed disk drive 1275. Fixed disk drive 1275 may be a part of controller 1200 or may be separate and accessed through other interface systems. Network interface 1285 may provide a direct connection to a remote server via a direct network link to the Internet via a POP (point of presence). Network interface 1285 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1200 wirelessly via network interface 1285.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 12 need not be present to practice the present systems and methods. The devices and subsystems can be interconnected in different ways from that shown in FIG. 12. The aspect of some operations of a system such as that shown in FIG. 12 are readily known in the art and are not discussed in detail in this application. Code to implement the present disclosure can be stored in a non-transitory computer-readable medium such as one or more of system memory 1215 or fixed disk 1275. The operating system provided on controller 1200 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. An apparatus for controlling settings of a home automation system, comprising:
   a processor;
   a memory in electronic communication with the processor; and
   instructions stored in the memory, the instructions being executable by the processor to:
      receive instructions about an intended action to be performed by a user of the home automation system;
      after receiving the instructions, detect behavior of the user with the home automation system;
      determine a level of certainty regarding whether the intended action has occurred based on the detected behavior;
      compare the determined level of certainty of the detected behavior with certainty levels of other behaviors associated with the intended action;
      rank the detected behavior based at least in part on the determined level of certainty and the comparison; and
      when the intended action is determined to have occurred within a predetermined time period from receiving the instructions, adaptively update one or more settings of the home automation system in an order that is based at least in part on the ranking; and
      when the intended action is determined to not have occurred within the predetermined time period, communicate with the user regarding the instructions about the intended action.

2. The apparatus of claim 1, wherein the behavior of the user is detected within a home monitored by the home automation system.

3. The apparatus of claim 1, wherein the intended action includes departing a property being monitored by the home automation system and the detected behavior indicates with a predetermined level of probability that the user has left the property.

4. The apparatus of claim 1, wherein the behavior of the user is based at least in part on one of a geo-fence signal, a door operation sensor signal, and a motion sensor signal.

5. The apparatus of claim 1, wherein the home automation system comprises security features, and the one or more settings of the home automation system includes a security setting related to at least one of the security features.

6. The apparatus of claim 1, wherein the one or more settings of the home automation system includes at least one of an HVAC setting, at least one light fixture setting, at least one security setting, and at least one lock mechanism setting for a barrier.

7. The apparatus of claim 1, wherein the instructions are executable by the processor to:
   initiate an active state after receiving the instructions, the active state including prompting continuous monitoring of the behavior of the user; and
   canceling the active state if the intended action does not occur within the predetermined time period.

8. The apparatus of claim 1, wherein the instructions are received via at least one of a control panel of the home automation system and a mobile computing device.

9. A computer-program product for controlling a home automation system, the computer-program product comprising a non-transitory computer-readable medium storing instructions executable by a processor to:
   receive an indication that a user of the home automation system intends to depart a property being monitored by the home automation system;
   after receiving the indication, detect user behavior with the home automation system;
   determine a level of certainty regarding whether the user has left the property based at least in part on the detected user behavior;
   compare the determined level of certainty of the detected behavior with certainty levels of other behaviors associated with the intended action;
   rank the detected behavior based at least in part on the determined level of certainty and the comparison;
   when the user has been determined to have left the property within a predetermined time period from receiving the indication, adaptively update one or more settings of the home automation system in an order that is based at least in part on the ranking;
   when the user has been determined to have not left the property within the predetermined time period from receiving the indication, communicate with the user regarding the indication; and
   operate the home automation system based at least in part on the updated one or more settings.

10. The computer-program product of claim 9, wherein the behavior includes at least one of operating an exterior door, operating a light fixture, presence in a certain location of the property, and operating a garage door.

11. The computer-program product of claim 9, wherein the one or more settings control at least one of a security feature, an HVAC system, a light fixture, and a lock mechanism.

12. The computer-program product of claim 9, wherein communicate with the user regarding the indication further comprises:
   generate a message for the user if the user has not departed the property within the predetermined time period.

13. The computer-program product of claim 12, wherein the message includes an inquiry concerning an intent of the user to depart the property.

14. The computer-program product of claim 12, wherein the message is in the form of at least one of an audible message or a text message generated at a control panel of the home automation system, generated at an appliance of the property, or generated by a mobile computing device associated with the user.

15. The computer-program product of claim 9, wherein the instructions are executable by the processor to:
receive instructions about a user of the home automation system to cancel the instructions.

16. A computer-implemented method for controlling settings of a home automation system, comprising:
receiving input concerning an intended action to be performed by at least one user of the home automation system;
initiating an active mode to continuously detect at least one of user locations, user movements, and user activities with the home automation system;
determining a level of certainty regarding whether the intended action has occurred based on the at least one of the detected user locations, the detected user movements, and the detected user activities;
comparing the determined level of certainty with certainty levels of other behaviors associated with the intended action;
ranking one or more of the user locations, user movements, and user activities based at least in part on the determined level of certainty and the comparison;
when the intended action is determined to have occurred within a first predetermined time period from receiving the input concerning the intended action, adaptively updating one or more settings of the home automation system in an order that is based at least in part on the ranking; and
automatically cancelling the active mode if the intended action has not occurred within the first predetermined time period.

17. The method of claim 16, further comprising:
generating a communication if the intended action has not occurred within a second predetermined time period that is less than the first predetermined time period.

18. The method of claim 17, further comprising:
receiving instructions in response to the communication; and
canceling the active mode in response to the instructions.

19. The method of claim 17, further comprising:
receiving instructions in response to the communication with the at least one user; and
continuing to monitor the at least one of user locations, user movements, and user activities.

20. The method of claim 1, wherein the predetermined time period is a first predetermined time period and wherein receiving instructions further comprises:
receiving instructions about a sequence of intended actions to be performed;
determining a level of certainty regarding whether the sequence of intended actions has occurred; and
adaptively updating one or more settings of the home automation system in an order determined on the ranking when the sequence of intended actions is determined to have occurred within a second predetermined time period from receiving the instructions.

* * * * *